Sept. 17, 1963    S. F. ANDERSON ETAL    3,103,959
FILLING MACHINE
Filed Oct. 26, 1960    5 Sheets-Sheet 1

Inventors
Swan F. Anderson
Ralph F. Anderson
Robert P. Sorensen
By McCanna, Morsbach & Pillote
Atty's Sept. 17, 1963  S. F. ANDERSON ETAL  3,103,959
FILLING MACHINE
Filed Oct. 26, 1960  5 Sheets-Sheet 2

Inventors
Swan F. Anderson
Ralph F. Anderson
Robert P. Sorensen
By McCanna Morsbach & Pillote
Atty's

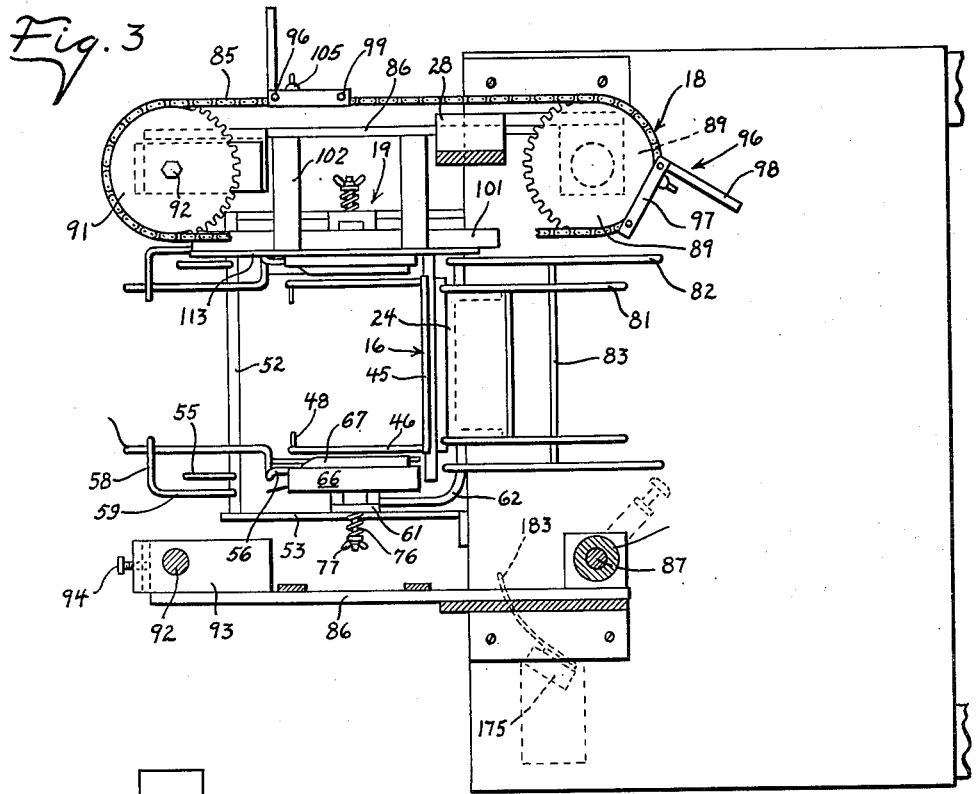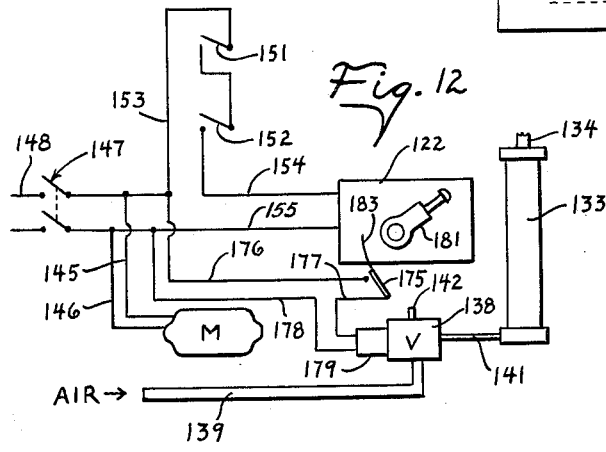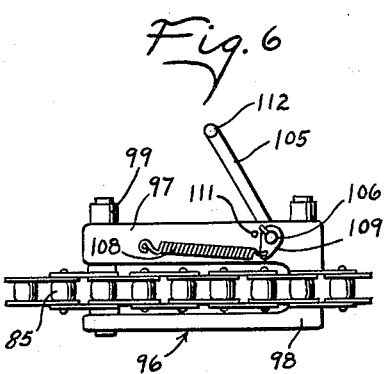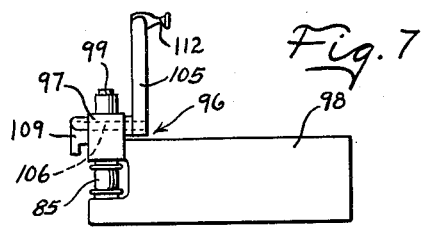

Sept. 17, 1963 S. F. ANDERSON ETAL 3,103,959
FILLING MACHINE
Filed Oct. 26, 1960 5 Sheets-Sheet 4

Inventors
Swan F. Anderson
Ralph F. Anderson
Robert P. Sorensen
By McCanna, Morsbach & Pillote
Atty's

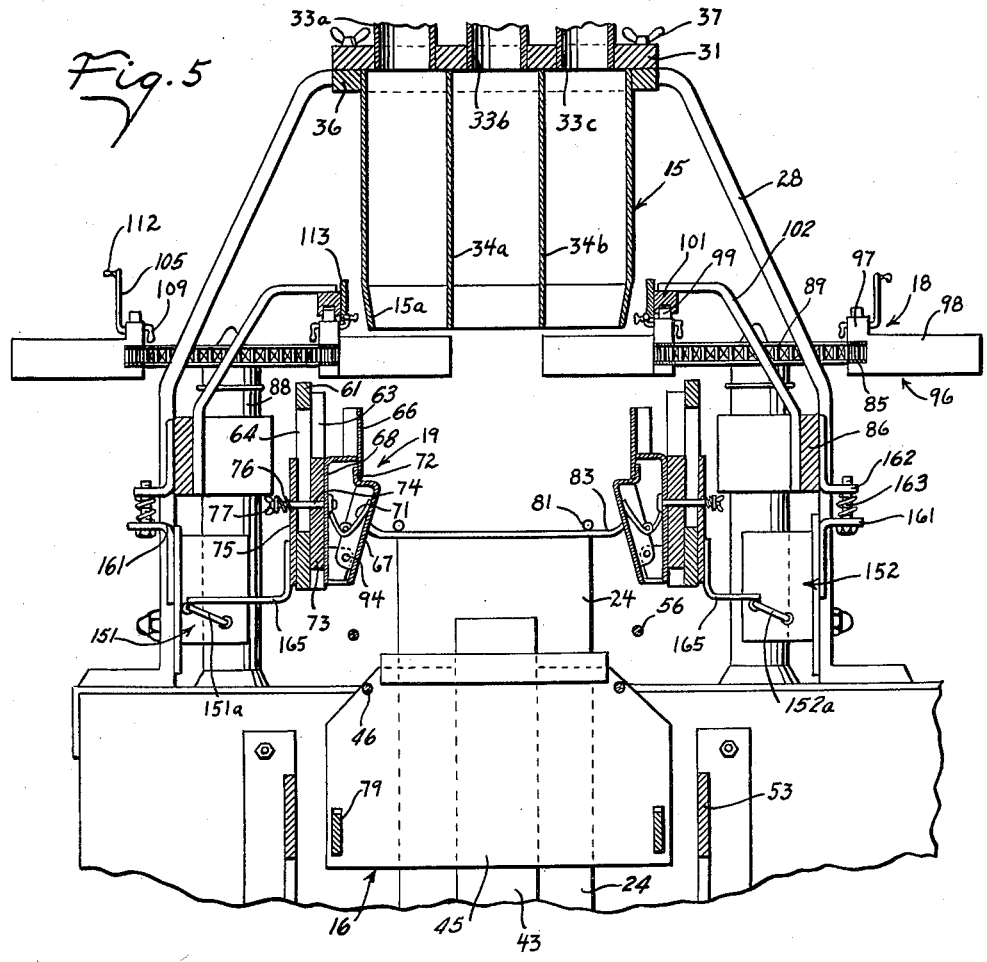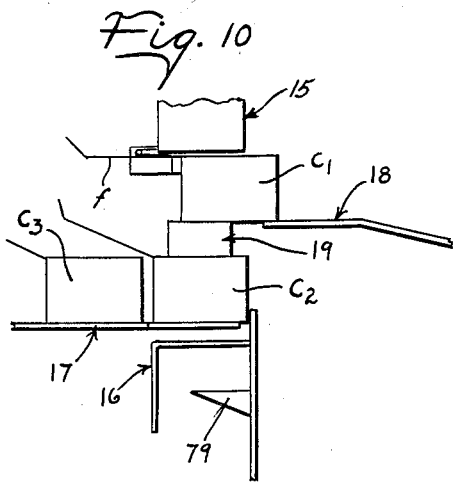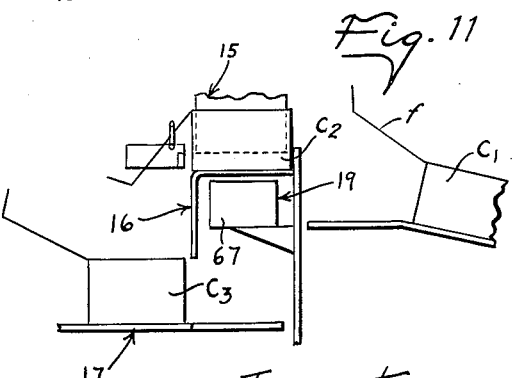

United States Patent Office 3,103,959
Patented Sept. 17, 1963

3,103,959
FILLING MACHINE
Swan F. Anderson, Ralph F. Anderson, and Robert P. Sorensen, Rockford, Ill.; said Robert P. Sorensen and said Swan F. Anderson assignors, by direct and mesne assignments, of three-fourths to said Ralph F. Anderson, and one-fourth to Vera Spencer, Rockford, Ill.
Filed Oct. 26, 1960, Ser. No. 65,060
20 Claims. (Cl. 141—131)

This invention relates to a container filling apparatus and particularly to an apparatus for filling containers with a semi-solid material such as ice cream and the like.

An important object of this invention is to provide a filling machine in which the flow of material from the nozzle is continuous and in which the containers are advanced to the nozzle and removed therefrom in such a manner as to maintain a container below the nozzle at all times to receive any material which flows from the nozzle.

A more particular object of this invention is to provide a container filling machine in which the empty containers are advanced to a position spaced an appreciable distance below the filler nozzle; elevated to a position in registry with the nozzle; and moved away from the nozzle at a level sufficiently above the level at which the containers are fed to the machine to enable a succeeding empty container to be advanced to a position below the nozzle prior to movement of a filled container away from the nozzle.

Another object of this invention is to provide a filling machine of the type in which the flow of material from the nozzle is continuous and a lift member is provided for raising a container into telescopic relation with the nozzle, which apparatus has means separate from the lift member for supporting and controlling downward movement of the container to enable the lift member to be lowered and a succeeding container advanced onto the lift member prior to completion of the filling of the elevated container.

Yet another object of this invention is to provide an apparatus for filling semi-solid materials such as ice cream and the like into cartons of the type having a cover flap hinged to the upper edge thereof, which apparatus has means for moving the cartons crosswise of the nozzle to shear off the semi-solid material flush with the top of the carton and mechanism for depressing the cover flap away from the nozzle as the carton is moved crosswise thereof.

Still another object of this invention is to provide a container filling apparatus which will accurately and uniformly fill containers at a rapid rate.

These, together with various ancillary objects and advantages of this invention, will be more readily appreciated as the same becomes better understood by reference to the following detailed description when taken in connection with the accompanying drawings wherein;

FIG. 3 is a horizontal sectional view taken on the plane 3—3 of FIGURE 1;

FIG. 5 is a fragmentary vertical sectional view taken on the plane 5—5 of FIGURE 1;

FIG. 6 is an enlarged fragmentary view of one of the conveyor elements;

FIG. 7 is an end elevational view of the conveyor element of FIG. 6;

FIGS. 8, 9, 10 and 11 are diagrammatic views illustrating a cycle of operation of the filling apparatus; and FIG. 12 is a schematic diagram illustrating the controls for the filling apparatus.

Figure 1:
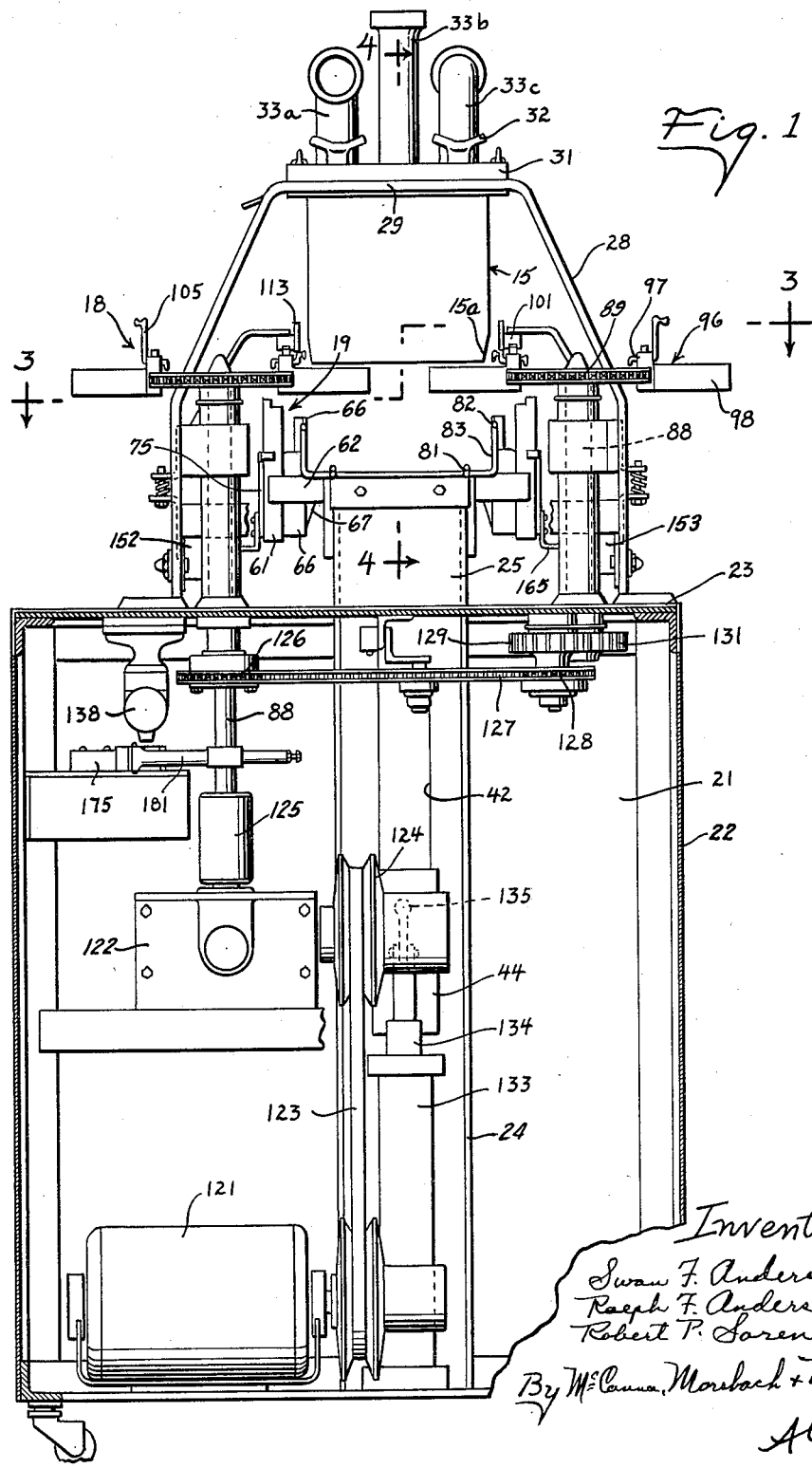
FIGURE 1 is a rear elevational view of the filling machine with parts of the housing broken away to illustrate the drive mechanism.

The filling machine of the present invention, while generally adapted for use in filling containers with fluent materials, is specifically designed for filling semi-solid materials such as ice cream, sherbet and the like. In general, the filling machine includes a nozzle 15, an elevator mechanism 16 for raising a container into telescopic relation with the nozzle, an inlet conveyor mechanism 17 for advancing and supporting empty containers in a position over the elevator when the latter is in its lowered position, and a discharge conveyor mechanism 18 for removing filled containers from below the nozzle. In accordance with the present invention, a container support mechanism 19 is provided for supporting the containers after they have been elevated by the elevating mechanism, and the inlet and discharge conveyors are so arranged with respect to each other and to the nozzle as to enable an empty container to be advanced onto the elevator below the filler nozzle prior to removal of the filled container from below the nozzle, to thereby maintain a container below the nozzle at all times.

Figure 4:
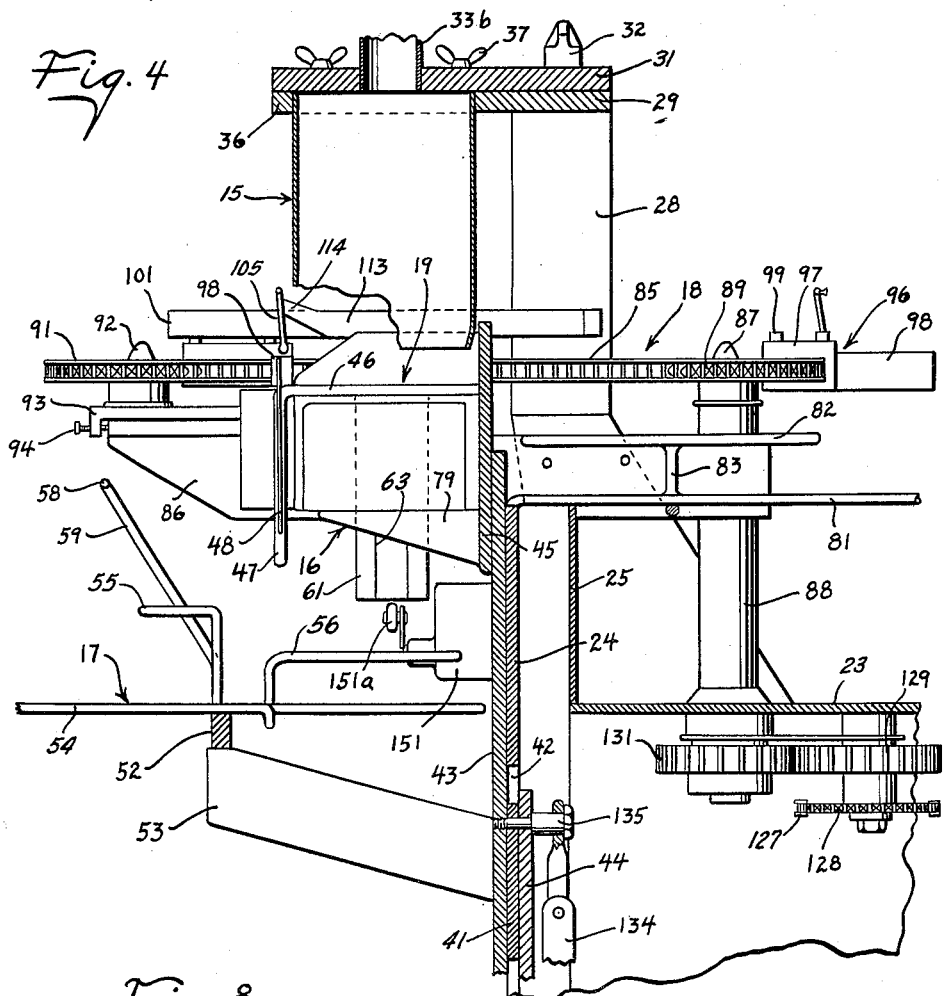
FIG. 4 is a fragmentary vertical sectional view taken on the plane 4—4 of FIGURE 1.

The several instrumentalities are mounted on a base including a front wall 21, spaced side walls 22 and a top wall 23. A vertically extending channel 24 is mounted on the front wall of the base. The channel projects above the top wall 23, as best shown in FIGS. 1 and 4, and a plate 25 is mounted to extend across a rear face of the channel between the top wall 23 of the base and the upper end of the channel.

The nozzle 15 is supported on the top wall 23 of the base by means of a generally U-shaped bracket having spaced legs 28 and a connecting bar 29. A plate 31 is detachably secured as by thumb bolts 32 to the bar 29 and projects laterally thereof. The ice cream filler tubes are attached to the plate 31 and, as shown, three tubes designated 33a, 33b and 33c are attached to the plate 31. The tubes are adapted for connection to conventional continuous type freezers and, as is apparent, different ice cream flavors can be supplied to the different tubes to fill the package with multiple flavors. As shown in FIG. 5, partitions 34a and 34b are provided in the nozzle to segregate the different flavors. The nozzle 15 has a cross-sectional configuration corresponding to that of the container to be filled and has a frame 36 at its upper end, which frame is detachably secured to the plate 31 as by wing bolts 37. The lower end of the nozzle 15 is preferably formed with a slight lower taper designated 15a to facilitate telescoping of the container over the nozzle.

The elevator 16 is mounted on the vertically extending channel 24 at the front of the base. As shown in FIG. 4, the elevator includes a slide block 41 which is slidably received in a vertically extending slot 42 in the channel. A front slide plate 43 and a rear slide plate 44 respectively overlie the front and rear sides of the channel. An elevator plate 45 is attached to the upper end of the front slide plate. The elevator platform is of open construction and comprises a pair of spaced bars 46 which are attached to the elevator plate and extend forwardly thereof. Container stop arms 47 extend downwardly from the forward ends of the bars 46 and are arranged to engage and stop a succeeding container to prevent advancement of the same to a position below the nozzle, while the elevator is in its raised position. Resilient fingers 48 are attached at their lower ends to the arms 47 and project above the elevator bars 46 to aid in separating the container on the elevator platform from the next succeeding container, when the elevator is raised.

The inlet conveyor 17 includes an open framework for laterally guiding and supporting a container in position over the elevator platform, and an apparatus such as the belt type conveyor 51 for feeding articles onto the container support. The container support is mounted on a crossbar 52 carried by brackets 53 from the front wall of the base. A plurality of support bars 54 are attached to the crossbar and extend into overlying relation with the elevator platform to support a container thereabove. The containers are laterally guided by spaced bars 55 and 56 which are respectively attached to the crossbar 52 and to the support bar 54, and which guide bars serve to laterally position the container above the elevator platform and in proper position with respect to the filler nozzle 15. The filling mechanism herein disclosed is specifically designed for filling cartons having a hinged cover flap along the trailing edge thereof and, for this purpose, opposed flap deflector fingers 58 are attached by arms 59 to the crossbar 52. The deflector fingers extend inwardly toward each other as best shown in FIG. 3 at a level above the container to engage the cover flap and deflect the same downwardly as the container is advanced onto the elevator platform.

The container supports 19 are disposed at relatively opposite sides of the path of travel of the elevator and are arranged to engage and support an elevated container during filling thereof so that the elevator may be returned to its lower position prior to completion of the filling operation. The container supports are similarly constructed and like numerals are utilized to designate corresponding parts. Each support includes a guide block 61 which is attached by a generally L-shaped bracket 62 (FIG. 3) to the channel member 24 adjacent its upper end. Vertically movable mounting brackets are mounted for limited sliding movement on the guide block 61 and, in the embodiment illustrated, the mounting brackets are in the form of spaced carton guide plates 66 having an enlarged opening in the lower portion thereof. Support members or shoes 67 are pivotally mounted on the guide plates and are movable laterally thereof into underlying relation with an elevated carton to support the same. As is best shown in FIG. 5, the guide plates 66 have a generally boxed shaped casing 68 attached to the rear side thereof and the support shoes 67 are pivotally mounted adjacent their lower ends by a pin 69 carried by the casing. The shoes are yieldably urged in a direction laterally of the guide plates 66 by a spring 71, and a stop finger 72 is provided on each of these shoes to engage the rear side of the guide plate to stop the shoes in the position shown in FIG. 5 with the shoes extending upwardly and inwardly into the path of movement of the container on the elevator. Each guide plate 66 and its shoes 67 is mounted for vertical movement in the guideways 63 by a bar 73 and a bolt 74 extends through the slot 64 and through an outer plate 75. The plate 75 and the bar 73 are yieldably pressed against opposite sides of the guide block 61 by a spring 76 and thumb screw 77 to provide a friction type brake for yieldably holding the shoes in adjusted position along the guide blocks 61. The pressure applied by the thumb screw 77 and spring 76 is adjusted so as to hold support shoes 67 and the container in an elevated position, and to yield and allow the container to move downwardly under the pressure of the fluid material from the nozzle as it enters the container. Thus, as the container is raised by the elevator 16, the container deflects the shoes 67 into the casings 68 until the container rises above the shoes at which time the latter return to the position shown in FIG. 5. Spaced arms 79 are attached to the elevator plate 45 and are positioned so as to engage the underside of the guide plates 66 after the container has been elevated above the shoes, to raise the guide plates and shoes to an elevated position as shown in FIG. 4. When the elevator is thereafter retracted to receive a succeeding container, the raised container is supported on the shoes 67 and the pressure of the semi-solid material entering in the container forces the container and the shoes downwardly.

Figure 2:
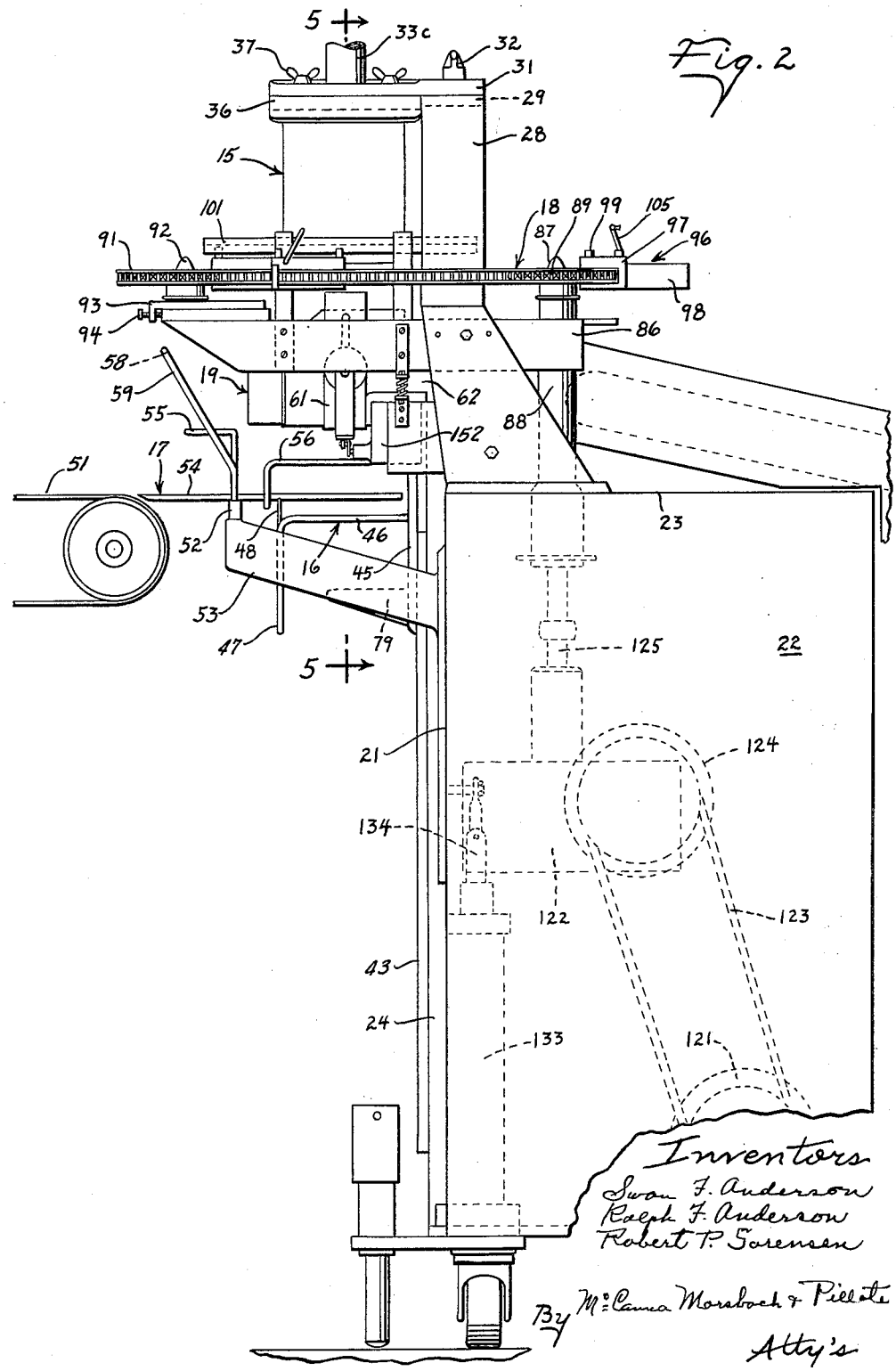
FIG. 2 is a side elevational view of the filling apparatus.

The discharge conveyer 18 is positioned and operated so as to move the filled container crosswise of the nozzle while maintaining the container at a level spaced above the inlet conveyer 17 a distance somewhat greater than the height of a container. The discharge conveyer includes spaced support bars 81 attached to the upper end of the channel member 24, and lateral guide members 82 attached by a bracket 83 to the support members 81. As is shown in FIGS. 2, 4 and 5, the support members 81 of the discharge conveyer are spaced above the support members 54 of the inlet conveyer a distance greater than the height of a carton to be filled. The discharge conveyer 18 also includes a pair of endless-type conveyers 85 disposed at opposite sides of the nozzle and each having a run extending crosswise of the nozzle. The endless conveyers are supported on spaced side rails 86 attached to the legs 28 of the nozzle support yoke. The endless conveyers at each side of the nozzle are similarly constructed and like numerals are utilized to designate corresponding parts. Each of the endless conveyers includes a drive shaft 87 rotatably supported in a housing 88 attached to one end of a respective one of the rails. A rear sprocket 89 is attached to the upper end of each drive shaft and a front sprocket 91 is rotatably supported on a stub shaft 92 adjacent the forward ends of the rails 86. As shown in FIG. 3, the stub shafts 92 are mounted on a bracket 93 for adjustment toward and away from the rear sprocket and an adjusting screw 94 is provided to facilitate this adjustment. The chain 85 is disposed around each of the front and rear sprockets and a plurality of conveyer elements 96 are mounted on each chain. The conveyer elements each comprise a generally L-shaped member, one leg 97 of which is attached to the respective chain with the other leg 98 extending laterally thereof as is clearly shown in FIG. 3. The arms 98 of the conveyer elements are arranged to push the filled containers crosswise of the nozzle so that the trailing edge of the container shears off the semi-solid material flush with the top of the box and are therefore advantageously arranged so as to move along a path closely adjacent the underside of the nozzle, as is clearly shown in FIG. 5, so as to push the cartons adjacent the upper edge thereof. The container engaging elements 96 are guided during movement crosswise of the nozzle by means of pins 99 which extend upwardly from the elements 96 into channel-shaped trackways 101. As best shown in FIG. 5, the trackways 101 are supported by brackets 102 on the rails 86.

The filling machine of the present invention is specifically designed for use in filling cartons designated C, of the type having a cover flap f hinged to one side edge thereof. In order to prevent the wiping of the cover flap against the material extruded from the nozzle, as the container is moved crosswise thereof, provision is made for depressing the cover flap during movement across the nozzle. For this purpose, a depressor arm 105, best shown in FIGS. 6 and 7, is mounted by a pin 106 on one leg 97 of each container engaging element, to permit vertical pivotal movement of the arm relative to the container engaging element. The arms are normally urged to a generally upright position by means of a spring 108 which is terminally attached to the leg 97 and to a lever 109 on the pivot pin 106. A stop 111 is provided on the leg 97 of the respective conveyer elements to normally support the arms 105 in an upright position. A finger 112 is provided on the free end of each arm and extends laterally thereof, as best shown in FIG. 7, so as to engage the cover flap f on the container when the arms 105 are swung downwardly. A cam plate 113 is attached to each of the tracks 101 to extend alongside thereof and has a nose portion 114 (see FIG. 4) which engages the arms 105 to swing the latter downwardly and depress the cover flap, as the conveyer elements are moved crosswise of the nozzle. The cam plate 113 extends beyond the nozzle so as to maintain the cover flap depressed until the container has been moved past the nozzle a distance sufficient to permit the cover flap to clear the nozzle.

The endless conveyers are intermittently driven from the drive motor 121 through a conventional one revolution clutch 122. The motor 121 is drivingly connected to the one revolution clutch by means of a belt 123 and a variable speed pulley 124. The clutch 122 is electrically actuated and rotates its output shaft 125 through one revolution each time it is actuated. The output shaft 125 is connected to the drive shaft 88 leading to one of the rear conveyer sprockets 89. The other conveyer sprocket is driven at the same speed, but in a relatively opposite direction. As shown in FIG. 1, a sprocket 126 on one of the shafts 88 is connected through a chain 127 to an idler sprocket 128. The idler sprocket 128 drives a gear 129 in meshing engagement with a gear 131 on the other shaft 88.

Figure 8:
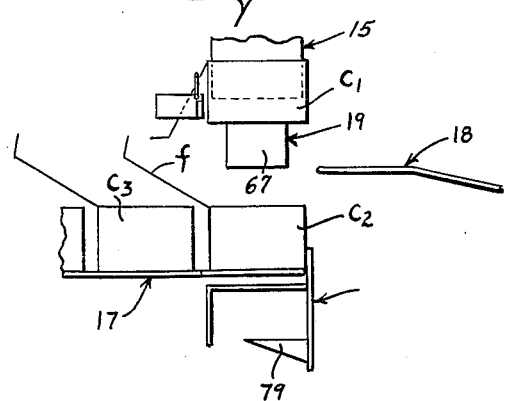
Figure 9:
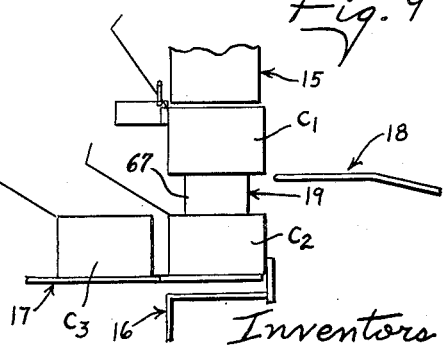

In the embodiment illustrated, the elevator is operated by means of a pneumatic cylinder 133 having a piston 134. The cylinder is mounted on the base and the piston is connected by a pin 135 to the slide plate 44 and 43. Air is supplied to the cylinder under the control of an electrically operated three-way valve 138 (FIGS. 8 and 12). As diagrammatically shown in FIG. 12, the valve has an inlet conduit 139 connected to a source of compressed air (not shown); a pipe 141 leading to the cylinder 133, and a vent outlet 142. The valve may be of any conventional construction which is operative in one position thereof to supply fluid under pressure from the conduit 139 to the cylinder 133, and in the other position thereof to vent fluid from the cylinder. As is also diagrammatically shown in FIG. 12, the motor 121 is connected through conductors 145 and 146 and main shut-off switch 147 to the power supply conductors 148. Power is supplied to the electrically operated one revolution clutch 122 under the control of a pair of switches 151 and 152. The switches 151 and 152 are connected in series with each other, and through conductors 153, 154 and 155 to the one revolution clutch and to the main control switch 147 so as to operate the clutch only when both switches 151 and 152 have been closed. The switches 151 and 152 are arranged so as to be automatically operated when the container is filled and the upper edge of the container is at the level of the lower end of the filler nozzle. As shown in FIG. 5, the switches 151 and 152 are each adjustably mounted by means of brackets 161 and bolts 163 on a respective one of the side rails 86 and are adjustable vertically by tightening or loosening the bolts. As previously mentioned, the guide plates 66 and the container support shoes 67 move downwardly with the container, as the latter is filled, and switch operating fingers 165 are attached to the outer plates of each container support 19 to engage and operate the respective one of the switch actuators 151a and 152a when the container reaches a pre-selected lower position. As is apparent, the container position at which the switches are operated can be selectively adjusted by adjusting the vertical position of the switches 151 and 152. While a single switch could be utilized, it is preferable to employ one switch at each side of the filler machine and to connect the switches in series as shown in FIG. 12 so as to operate the clutch 122 only when both sides of the container have been moved downwardly the proper distance. This assures uniform filling of the container and minimizes the possibility that the container will be cocked or tilted relative to the nozzle as it is moved crosswise thereof.

When the clutch 122 is operated, the endless conveyers 85 are indexed to move the container crosswise of the nozzle, off the support shoes 67 and onto the support bars 81. After the discharge conveyer has moved the filled container out from below the nozzle, the elevator 16 is operated to raise the succeeding container into telescopic relation with the nozzle. As shown in FIG. 12, the fluid control valve 138 is operated under the control of a switch 175 which is connected through conductors 176, 177 and 178 to the electro-responsive valve operator 179 and to the main shut-off switch 147. The valve 138 is normally positioned to vent fluid from the cylinder 133 and, when the switch 175 is closed, the valve is operated to supply fluid thereto to extend the piston 134. The switch 175 is operated by means of an arm 181 which is attached to the output shaft 125 for rotation therewith. The arm engages an elongated actuator 183 on the switch to close the switch after the conveyer has been advanced a pre-selected distance, and to maintain the switch closed for a time interval sufficient to permit the piston to extend the elevator. As the arm 181 moves out of engagement with the switch operator 183, the valve returns to its normal position and vents fluid from the cylinder so that the elevator returns to its retracted position.

The operation of the filler machine is diagrammatically illustrated in FIGS. 8–11. For convenience, it is assumed that one container designated $C_1$ has been moved into telescopic relation with the nozzle 15 and a succeeding container designated $C_2$ is positioned over the elevator 16, as shown in FIG. 8. As the nozzle fills the container, it presses the container and the support shoes 67 downwardly. When the container $C_1$ reaches a level shown in FIG. 9 in which the upper edge thereof is substantially flush with the underside of the nozzle, the switches 151 and 152 are closed to operate the clutch 122. This indexes the endless conveyers 85 so that the conveyer elements 96 push the filled container crosswise of the nozzle and off the support shoes 67 as shown in FIG. 10. As the filled container moves crosswise of the nozzle, the arms 105 depress the cover flap $f$ as shown in FIG. 10 to prevent the flap from dragging against the material being extruded from the nozzle. Since the succeeding container $C_2$ is in position over the elevator and below the nozzle, prior to completion of the filling of the container $C_1$, it is apparent that the container $C_2$ can catch any material that drips from the nozzle. When the container $C_1$ has been moved to a position away from the nozzle as shown in FIG. 11, the arm 181 on the drive shaft 88 operates the switch 175 to actuate the fluid control valve 138 and extend the piston. When the piston is extended it raises the second container $C_2$ into position below the nozzle and simultaneously elevates the support shoes 67 so as to support the raised container in elevated position. Thereafter, the arm 181 on the output shaft 125 moves out of engagement with the switch actuator 183 and allows the elevator to return to its lower position shown in FIG. 8 prior to filling of the raised carton so that a succeeding carton, designated $C_3$ can move into position over the elevator.

We claim:

1. A container filling apparatus including a filler nozzle having a downwardly opening discharge mouth, a lifting member positioned below the nozzle, means for raising and lowering the lifting member to elevate a container into registry with the nozzle for filling, means operative when the container is elevated for yieldably opposing downward movement of the container, inlet conveyer means for advancing a container onto the lifting member, and discharge conveyer means for moving filled containers horizontally away from the nozzle, characterized in that the inlet conveyer means is positioned at a level to advance empty containers onto the lifting member when the latter is in its lower position and the discharge conveyer means is positioned at a level sufficiently above the inlet conveyer means to support and move an elevated container away from the nozzle along a path spaced above the inlet conveyer a distance greater than the height of a container, and further characterized in that the means for raising and lowering the lifting member is operative to move the lifting member back to its lower position prior to completion of filling of the elevated container to enable the inlet conveyer means to advance an empty container onto the lifting member below the elevated container.

2. A container filling apparatus comprising a nozzle having a downwardly facing discharge opening for discharging a continuous flow of fluent material, a lifting member positioned below said nozzle, means for moving said lifting member from a lower position to a raised position to elevate a container into registry with the nozzle and for thereafter lowering the lifting member back to said lower position before the elevated container has been filled, container support means for supporting the elevated container when the lifting member is returned to its lower position, inlet conveyer means for advancing containers onto the lifting member when the latter is in its lower position, and discharge conveyer means spaced above said inlet conveyer means a distance greater than the height of a container for moving filled containers away from said nozzle to enable a succeeding container to be advanced by said inlet conveyer means onto said lifting member and below the elevated container on the container support means.

3. A container filling apparatus comprising inlet conveyer means, discharge conveyer means spaced above the inlet conveyer means a distance greater than the height of a container, means including a nozzle having a downwardly facing opening spaced above the discharge conveyer means for discharging a fluent material, elevator means for raising a container from said inlet conveyer means to a level above said discharge conveyer means, container support means separate from said elevator means for supporting an elevated container below the nozzle during filling of the container at a level no lower than said discharge conveyer means, and means for operating said elevator means to raise a container and for thereafter lowering the elevator means to a level adjacent the inlet conveyer means to enable the inlet conveyer means to advance a succeeding container onto the elevator means and below the elevated container on said container support means.

4. A container filling apparatus comprising inlet conveyer means, discharge conveyer means spaced above said inlet conveyer means a distance greater than the height of a container, a nozzle having a downwardly facing discharge opening spaced above said discharge conveyer means, elevator means for raising a container from said inlet conveyer means to a level above said discharge conveyer means, support means engageable with an elevated container for yieldably opposing downward movement of the container as the latter is filled to a level no lower than said discharge conveyer, means operative when the container is filled for operating said discharge conveyer means to move a filled container away from the nozzle, and means operative when the filled container is moved away from the nozzle for operating said elevator means to raise a succeeding container and for thereafter lowering the elevator means to a level adjacent the inlet conveyer means to enable the inlet conveyer means to advance a succeeding container onto the elevator means and below the elevated container on the support means.

5. A container filling apparatus comprising inlet conveyer means, discharge conveyer means spaced above said inlet conveyer means a distance greater than the height of a container, a nozzle having a downwardly facing discharge mouth spaced above said discharge conveyer means, elevator means movable from a lower position adjacent the level of the inlet conveyer to a raised position for raising a container from said inlet conveyer means to a level above said discharge conveyer means and into telescoping relation with said nozzle, support means engageable with an elevated container for yieldably supporting the same for downward movement as the container is filled by the nozzle, means operative when the upper edge of the container moves downwardly to the level of the mouth of the nozzle for operating said discharge conveyer means to move a filled container off said support means and away from the nozzle, and means for moving said elevator means back to its lower position prior to operation of said discharge conveyer means to enable the inlet conveyer means to advance a succeeding container onto the elevator means and below the elevator container on said support means.

6. A container filling apparatus comprising inlet conveyor means, discharge conveyer means spaced above said inlet conveyer means a distance greater than the height of a container, a nozzle having a downwardly facing discharge mouth spaced above said discharge conveyer means, elevator means movable from a lower position adjacent the level of the inlet conveyer means to a raised position for raising a container from said inlet conveyer means to a level above said discharge conveyer means and into telescoping relation with said nozzle, container support means engageable with an elevated container for supporting the same, means mounting said support means for vertical movement for yieldably opposing downward movement of the support means and container as the latter is filled, means operated by said support means when the upper edge of the container moves downwardly to adjacent the level of the mouth of the nozzle for operating said discharge conveyer means to move a filled container away from the nozzle, and means for moving said elevator means back to its lower position prior to filling of the raised container whereby to enable the inlet conveyer means to advance a succeeding container onto the elevator means and below the elevated container on the support means.

7. The combination of claim 6 including means responsive to movement of said elevator means to said raised position for raising said support means.

8. The combination of claim 6 wherein said support means comprises spaced mounting brackets disposed at opposite sides of the path of movement of the elevator means, means mounting said brackets for limited vertical movement and for yieldably opposing downward movement of said brackets, and support members carried by said brackets and movable laterally thereof into underlying relation to a container when the latter is raised by said elevator means.

9. The combination of claim 6 wherein said discharge conveyer means includes a pair of endless conveyers disposed at opposite sides of the nozzle and each having a plurality of container engaging elements extending laterally thereof for engaging a container below the nozzle to move the same off said support means.

10. A container filling apparatus comprising a nozzle having a downwardly facing discharge mouth, a lifting member disposed below the nozzle for elevating a container into telescoping relation to the nozzle, means for supporting an elevated container during filling thereof, said support means including a mounting bracket mounted for vertical movement alongside the path of movement of the lifting member and a support member movable laterally of the mounting bracket into engagement with the underside of a container when it is raised by the lifting member to support the elevated container, means for operating said lifting member to elevate a container above said support member and to thereafter lower the lifting member to a position below the support member prior to completion of the filling of the container, means for yieldably opposing downward movement of said mounting bracket to control filling of the container on the support member, and means operative when said mounting bracket moves downwardly to a position in which the upper edge of the container on the support means is adjacent the level of the mouth of the nozzle for moving the container horizontally off the support member.

11. An apparatus for filling cartons having a cover flap hinged to the upper end of the cartons comprising, a nozzle having a downwardly opening discharge mouth, a lifting member for raising a carton into telescoping relation with the nozzle to be filled thereby, a horizontally movable conveyer means extending alongside the path of movement of the lifting member, a plurality of elements on said conveyer means extending laterally thereof for engaging a container to move the same crosswise of the nozzle, a plurality of arms mounted on the conveyer means for pivotal movement in a vertical plane and having a lateral flap engaging finger adapted to engage a cover flap of a container, cam means engageable with said arms for pivoting the same in a direction to depress said flap as the container engaging elements move crosswise of the nozzle, and means operative when the upper edge of the carton reaches the level of the mouth of the nozzle for operating said conveyer means to move a filled carton crosswise of the nozzle.

12. An apparatus for filling cartons having a cover flap hinged to the upper edge of the carton comprising a nozzle having a downwardly facing discharge mouth, a vertically movable lifting member positioned below the nozzle, a pair of container support means disposed at opposite sides of the path of travel of the lifting member for supporting a container in an elevated position, said support means each including a mounting bracket mounted for limited vertical movement; means for yieldably opposing downward movement of the bracket; and a support member mounted on the bracket for movement laterally thereof into underlying relation to a carton elevated by said lifting member, means for operating said lifting member to raise a carton to a level above said support members to be supported thereby and for thereafter lowering the lifting member, means operative in response to raising of said lifting member for moving said brackets upwardly to support a carton in telescoping relation with said nozzle, discharge conveyer means for moving a carton off said support members, and control means responsive to downward movement of said support means to a preselected lower position in which the upper end of the carton is adjacent the level of the mouth of the nozzle for operating said discharge conveyer means.

13. The combination of claim 12 wherein said control means includes a pair of switches each arranged for operation by a respective one of said support means when the support member reaches a preselected level, and means operatively connecting said switches together to effect operation of said discharge conveyer means only when both switches are operated to assure uniform filling of the carton.

14. The combination of claim 12 wherein said discharge conveyer means comprises a pair of endless-type conveyers each having one run extending alongside the path of travel of the lifting member above said support means, and a container engaging element on each conveyer extending laterally thereof for engagement with a container.

15. The combination of claim 14 including an arm mounted on at least one of the conveyers for vertical pivotal movement, a lateral finger on said arm adapted to engage the carton cover flap to depress the same, and means responsive to movement of said conveyers for swinging said arm in a direction to depress the carton flap away from the nozzle mouth.

16. The combination of claim 15 wherein said last-mentioned means comprises a cam plate disposed alongside said one run of said endless-type conveyer and disposed in the path of movement of said arm.

17. The combination of claim 12 wherein the lifting member when in its lower position is spaced below said preselected lower position of said support means a distance greater than the height of a container to enable advancement of a succeeding container onto the lifting member during filling of the container on said support means.

18. The combination of claim 12 wherein said support members are pivotally mounted adjacent their lower ends on said brackets and have means yieldably urging the support members to a position extending upwardly and inwardly relative to the guide members, said support members being shaped to be cammed outwardly as a container is moved upwardly therebetween.

19. An apparatus for filling cartons comprising, a nozzle having a downwardly facing discharge mouth, a vertically movable lifting member positioned below the nozzle, container support means disposed alongside the path of travel of said lifting member for supporting a container in an elevated position, said support means including a mounting bracket mounted for limited vertical movement; means yieldably opposing downward movement of the bracket; and a container support member mounted on the bracket for movement laterally thereof into underlying relation to a carton elevated by the lifting member, means for operating said lifting member to raise a carton to a level above said support member to be supported thereby, means operative in response to raising of said lifting member for moving said bracket upwardly to support a carton in telescoping relation with said nozzle, discharge conveyer means for moving a carton off said support member, and control means responsive to downward movement of said support means to a preselected lower position in which the upper end of the carton is adjacent the level of the mouth of the nozzle for operating said discharge conveyer means.

20. The combination of claim 19 wherein said lifting member when in its lower position is spaced below said preselected lower position of said support means a distance greater than the height of a container to be filled, and inlet conveyer means for advancing a container onto said lifting member when the latter is in its lower position to position a succeeding container on the lifting member and below the container on the support means during filling of the latter.

References Cited in the file of this patent
UNITED STATES PATENTS

| | | |
|---|---|---|
| 2,333,232 | Bleam et al. | Nov. 2, 1943 |
| 2,336,415 | Nordquist et al. | Dec. 7, 1943 |
| 2,405,232 | Nordquist | Aug. 6, 1946 |
| 2,718,993 | McKinnon | Sept. 27, 1955 |
| 2,927,611 | Tankersley | Mar. 8, 1960 |